US010640386B2

United States Patent
Chang et al.

(10) Patent No.: US 10,640,386 B2
(45) Date of Patent: May 5, 2020

(54) APPARATUS OF MANUFACTURING MESOPOROUS SILICA AND METHOD OF MANUFACTURING MESOPOROUS SILICA USING THE SAME

(71) Applicant: KOREA INSTITUTE OF CERAMIC ENGINEERING AND THCHNOLOGY, Gyeongsangnam-do (KR)

(72) Inventors: Jeong Ho Chang, Gyeonggi-do (KR); Hye Sun Lee, Seoul (KR)

(73) Assignee: KOREA INSTITUTE OF CERAMIC ENGINEERING AND TECHNOLOGY, Jinju-si, Gyeongsangnam-do (KR)

( * ) Notice: Subject to any disclaimer, the term of this patent is extended or adjusted under 35 U.S.C. 154(b) by 877 days.

(21) Appl. No.: 14/972,019

(22) Filed: Dec. 16, 2015

(65) Prior Publication Data

US 2016/0185607 A1    Jun. 30, 2016

(30) Foreign Application Priority Data

Dec. 29, 2014    (KR) .......................... 10-2014-0192119

(51) Int. Cl.
    *C01B 33/12*    (2006.01)
    *B01J 19/18*    (2006.01)
    *B01J 29/03*    (2006.01)

(52) U.S. Cl.
    CPC .............. *C01B 33/12* (2013.01); *B01J 19/18* (2013.01); *B01J 29/0308* (2013.01); *B01J 2219/00022* (2013.01); *B01J 2219/00029* (2013.01); *B01J 2219/00063* (2013.01); *B01J 2219/00094* (2013.01); *B01J 2219/00135* (2013.01); *B01J 2219/00162* (2013.01)

(58) Field of Classification Search
    CPC ....... C01B 33/12; B01J 19/18; B01J 29/0308; B01J 2219/00022; B01J 2219/00029; B01J 2219/00063; B01J 2219/00094; B01J 2219/00135; B01J 2219/00162
    See application file for complete search history.

(56) References Cited

U.S. PATENT DOCUMENTS

| 2,387,024 A * | 10/1945 | Hishon .................... B01J 3/002 165/76 |
| 2,538,089 A * | 1/1951 | Faton ......................... B01J 3/03 220/327 |
| 2006/0113509 A1* | 6/2006 | Norenberg ............... B05D 7/54 252/389.1 |

FOREIGN PATENT DOCUMENTS

| EP | 2256088 A1 * | 12/2010 | ........... C01B 37/005 |
| KR | 10-2006-0129090 A | 12/2006 | |
| KR | 10-2011-0098501 A | 9/2011 | |

* cited by examiner

*Primary Examiner* — Melvin C. Mayes
*Assistant Examiner* — Michael Forrest
(74) *Attorney, Agent, or Firm* — Revolution IP, PLLC

(57) ABSTRACT

An apparatus and a method of manufacturing mesoporous silica are provided. The apparatus includes a mount, a reactor rotatably coupled to the mount, in which mixed solution of surfactant, water and acid is to be poured, an impeller installed to the reactor and rotating to stir the mixed solution, and a heating unit installed to cover an outer surface of the reactor thereby heating the reactor.

2 Claims, 6 Drawing Sheets

APPARATUS OF MANUFACTURING MESOPOROUS SILICA AND METHOD OF MANUFACTURING MESOPOROUS SILICA USING THE SAME

CROSS-REFERENCE TO RELATED APPLICATION

This U.S. non-provisional patent application claims priority under 35 U.S.C. § 119 to Korean Patent Application No. 10-2014-0192119, filed on Dec. 29, 2014, in the Korean Intellectual Property Office, the disclosure of which is hereby incorporated by reference in its entirety.

BACKGROUND

Embodiments of the inventive concepts relate to an apparatus of manufacturing mesoporous silica and a method of manufacturing mesoporous silica using the same, and more particularly relate to an apparatus of manufacturing mesoporous silica capable of manufacturing a large quantity of mesoporous silica promptly and stably and a method of manufacturing mesoporous silica using the same.

Porous material has been applied to a catalyzer or a carrier because of large interior surface area. The porous materials are classified into microporous under 2 nm, mesoporous of 2 nm though 50 nm and macroporous over 50 nm according to size of pores.

In 1992, a synthesis of MCM-41 and MCM-48 which are a series of mesoporous materials named as M41 group was introduced by researchers of Mobile Corporation, and researchers of Santa Barbara independently synthesized mesoporous material named as SBA-15 from layered material similar with the MCM-41.

These materials are mesoporous material in which mesopores with uniform diameter from 2 nm to 10 nm are arranged regularly. These mesoporous materials have large surface area (700-1500 m/g) as well as chemical and thermal stability, and porous molecular sieve substance has regularly arranged micro pore with uniform size to separate and adsorb molecular level substance selectively and has advantage capable of controlling molecules in the pore to be widely used as a catalyst and a carrier for the catalyst.

In addition, other series of synthesizing methods for mesoporous material such as MSU, FSM can be examplned. Most mesoporous materials have particle size at micro scale, and mesoporous silica nanoparticles capable of arranging regularly and controlling particle shape have been synthesized in recent research.

A synthesizing method of Professor Victor Lin of Iowa State University is based on MCM-41 method, in which CTAB (Cetyltrimethylammonium bromide) is used as a surfactant in alkali state, Organotrimethoxysilane of ionize function group and TEOS (tetraethylorthorsilicate) are supplied followed by Sol-gel synthesis, thereby manufacturing mesoporous silica nanoparticles of nano-size.

Since this method of manufacturing mesoporous silica, however, needed stirring a mixed solution of acid and water followed by transferring to steel bomb and aging in closed system, there were problems that mass production was difficult and process time was much required.

SUMMARY

Embodiments of the inventive concept provide an apparatus of manufacturing mesoporous silica including: a mount; a reactor rotatably coupled to the mount, in which a mixed solution of surfactant, water and acid is to be poured; an impeller installed to the reactor and rotating to stir the mixed solution; and a heating unit installed to cover an outer surface of the reactor, thereby heating the reactor.

The reactor may include a cylindrical main body; a supporter coupled to a bottom surface of the main body; and a reactor cover covering a top surface of the main body.

Shafts may be respectively coupled on both sides of an upper portion of the main body, and the shafts may extend along a horizontal direction. A pair of brackets may be installed to the mount, and shafts may be inserted in the brackets, respectively.

A stopper may be formed to protrude from a bottom surface of the supporter. A coupling plate may be installed to the mount and may be coupled with the stopper to fasten the reactor to the mount.

A lifting apparatus may be installed on the mount. The lifting apparatus may apply external force to the reactor in order to rotate the reactor around the shaft.

The lifting apparatus may include: a pulley installed on the mount; a wire wound around pulley and connected to the reactor; and a rotation motor rotating the pulley.

The impeller may include: a rotation axis installed on the reactor cover; an impeller motor installed on an upper end portion of the rotation axis; and a blade installed on a lower end portion of the rotation axis.

A height adjusting apparatus may be installed on the mount. The height adjusting apparatus may be coupled to the impeller thereby moving the impeller vertically.

The height adjusting apparatus may include: a guide bar vertically installed on the mount; a slider coupled to the guide bar and movable in a vertical direction; and a connector connecting the slider and the impeller.

The heating unit may include: an inner case covering an outer surface of the main body; an outer case covering the inner case; and a heating line installed on an inner surface of the outer case.

A temperature sensor may be installed at the reactor cover and may extend into the reactor to detect temperature.

An ageing cap may be installed on the reactor cover. The ageing cap may close the reactor for ageing process of the mixed solution after removing the impeller.

A drain cap may be installed on the reactor cover. The drain cap may draw off the mesoporous silica after removing the aging cap.

An embodiment of the inventive concepts provides a method of manufacturing mesoporous silica including: pouring a mixed solution of surfactant, acid and water into a reactor after fastening the reactor on a mount; heating the reactor using a heating unit and simultaneously operating an impeller to stir the mixed solution; installing an ageing cap on a reactor cover to completely close the interior of the reactor after removing the impeller from the reactor cover; and heating the reactor by the heating unit to increase inner pressure of the reactor and to raise temperature of the mixed solution to perform the ageing of the mixed solution.

The method may further include rotating the reactor on the mount to draw off the mesoporous silica through a drain.

The method may further include adjusting height of the impeller in order to immerse a blade of the impeller in the mixed solution before the mixed solution is stirred by the impeller.

BRIEF DESCRIPTION OF THE DRAWINGS

The inventive concepts will become more apparent in view of the attached drawings and accompanying detailed description.

DETAILED DESCRIPTION OF THE EMBODIMENTS

Figure 1:
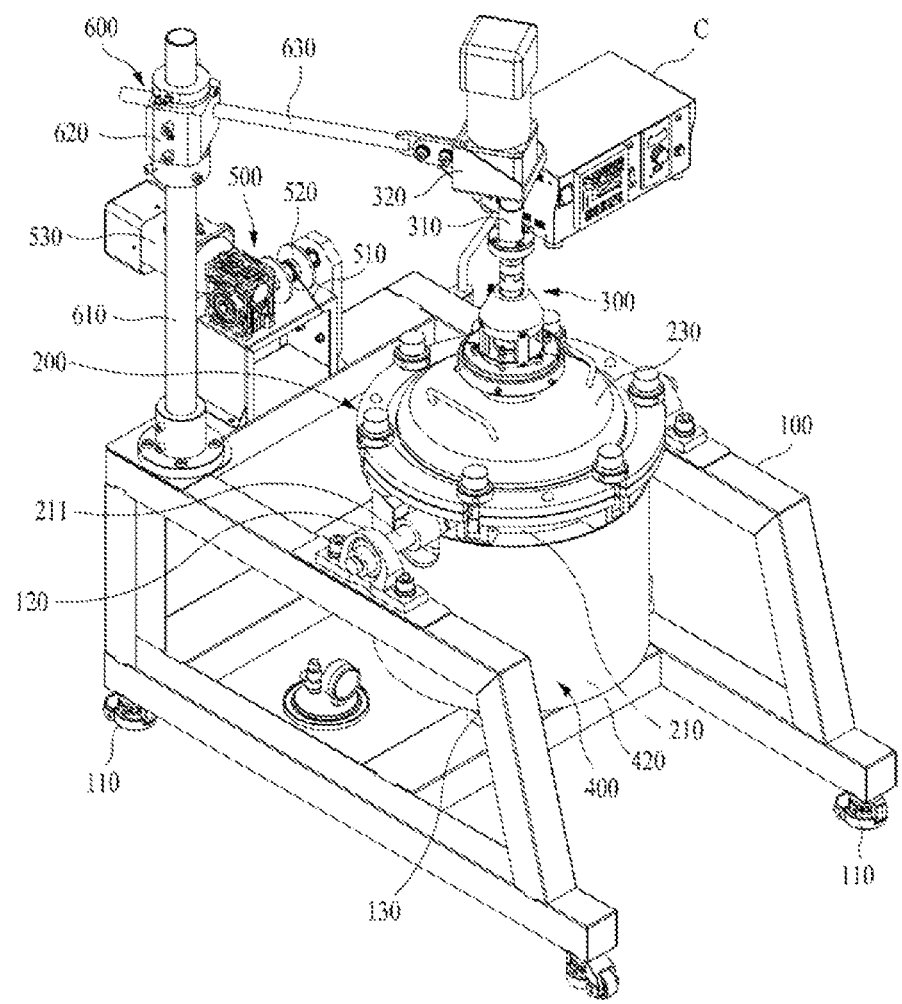
FIG. 1 is a perspective view illustrating an overall structure of an apparatus of manufacturing mesoporous silica according to an embodiment of the inventive concepts.

The inventive concepts will now be described more fully hereinafter with reference to the accompanying drawings, in which exemplary embodiments of the inventive concepts are shown. The advantages and features of the inventive concepts and methods of achieving them will be apparent from the following exemplary embodiments that will be described in more detail with reference to the accompanying drawings. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts. In the drawings, embodiments of the inventive concepts are not limited to the specific examples provided herein and are exaggerated for clarity.

Figure 2:
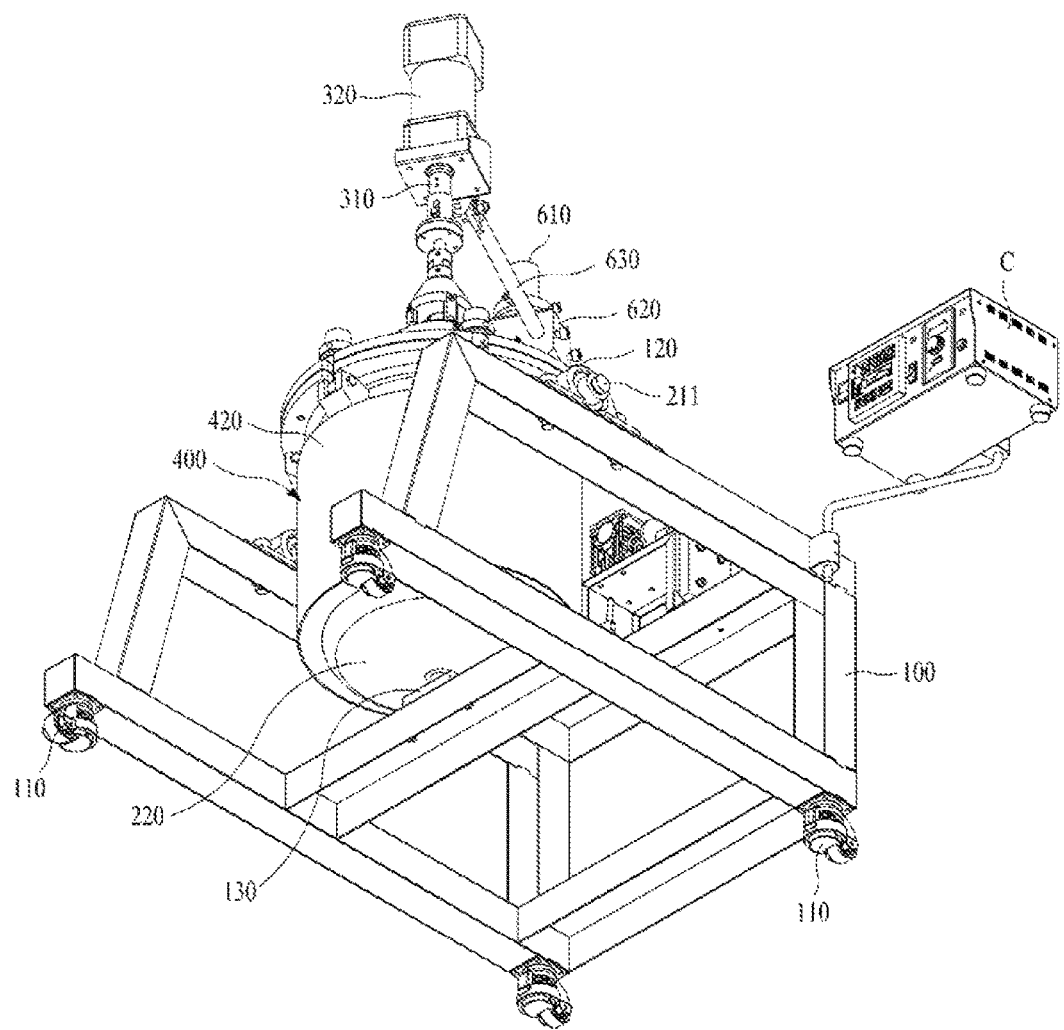
FIG. 2 is a lower perspective view illustrating an apparatus of manufacturing mesoporous silica according to an embodiment of the inventive concepts.
Figure 3:
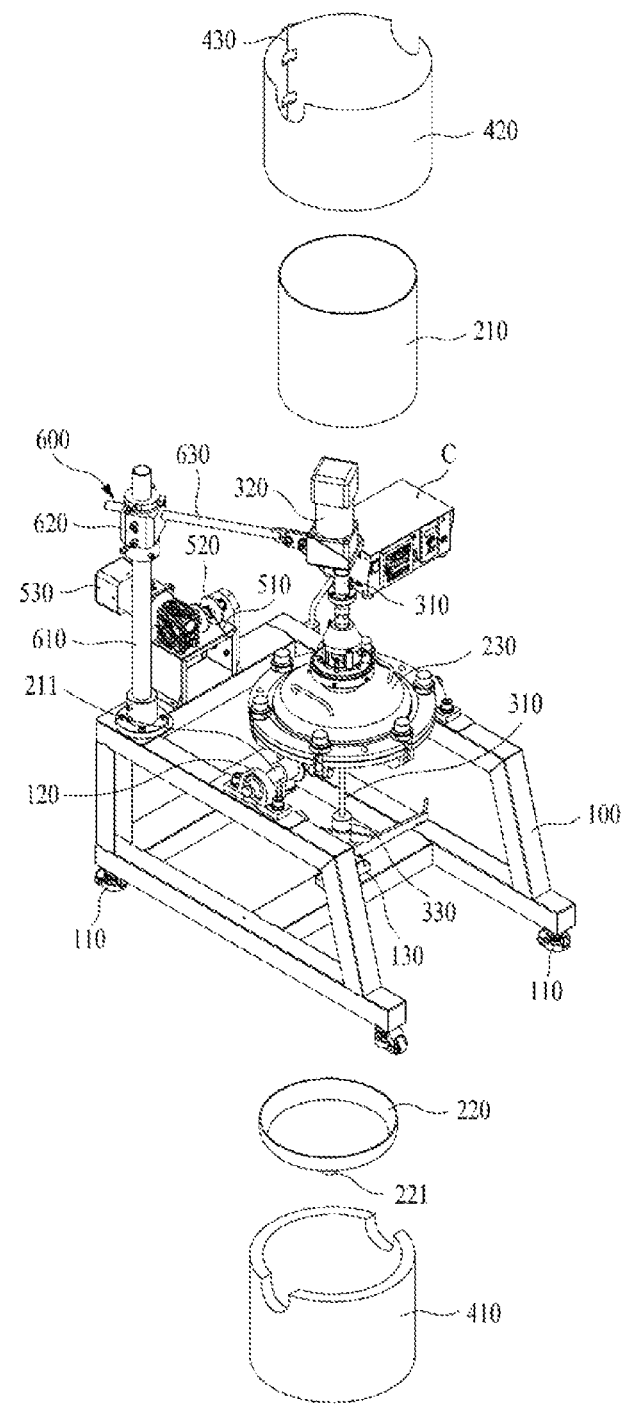
FIG. 3 is a perspective view illustrating a state where a reactor and a heating unit are disjointed from the apparatus of FIG. 1.
Figure 4:
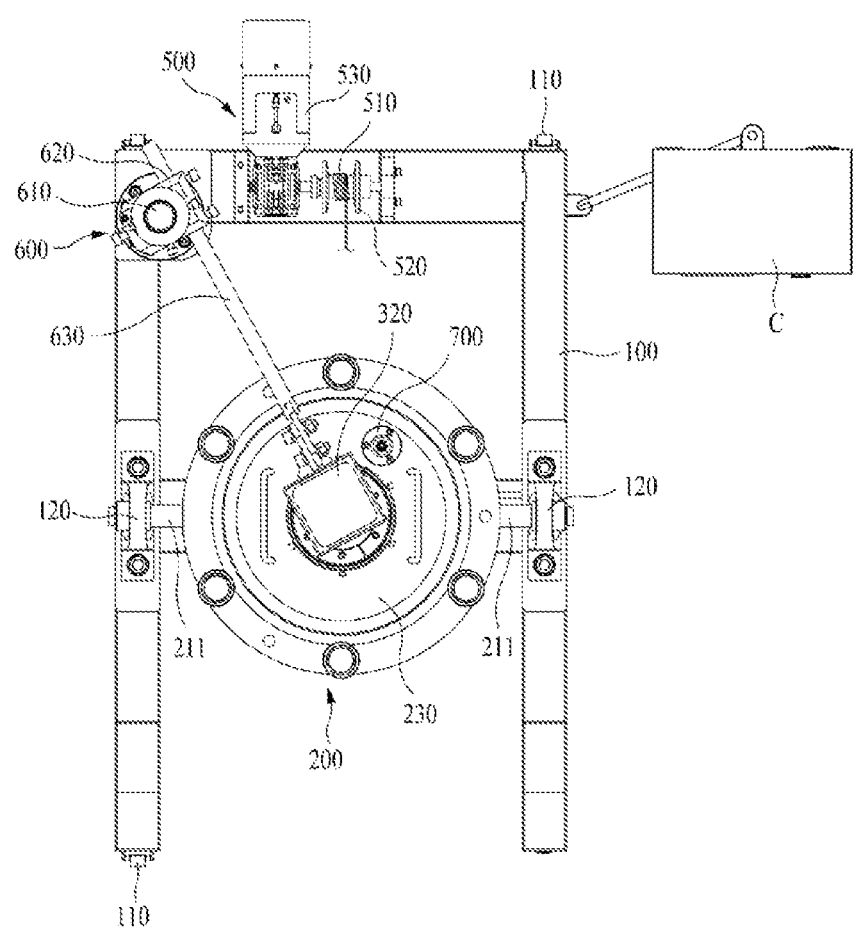
FIG. 4 is a top view illustrating an apparatus of manufacturing mesoporous silica according to an embodiment of the inventive concepts.
Figure 5:
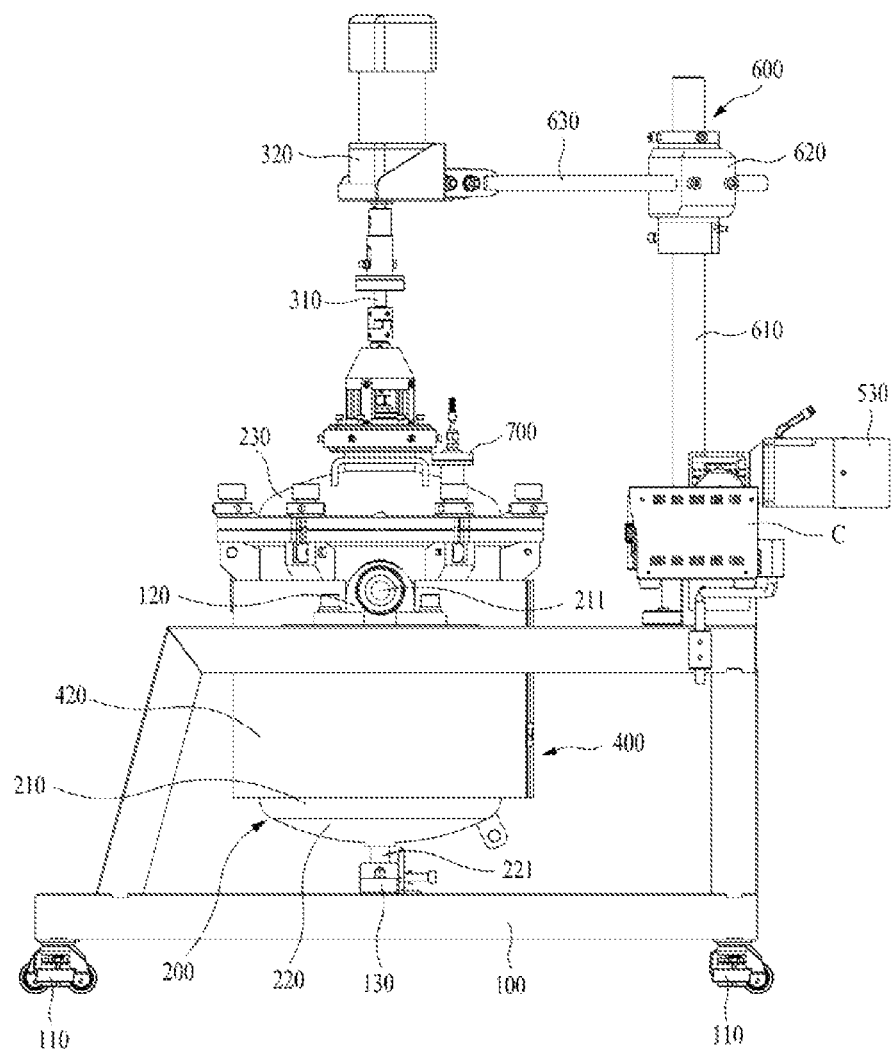
FIG. 5 is a side view illustrating an apparatus of manufacturing mesoporous silica according to an embodiment of the inventive concepts.

FIG. 1 is a perspective view illustrating an overall structure of an apparatus of manufacturing mesoporous silica according to an embodiment of the inventive concepts. FIG. 2 is a lower perspective view illustrating an apparatus of manufacturing mesoporous silica according to an embodiment of the inventive concepts. FIG. 3 is a perspective view illustrating a state where a reactor and a heating unit are disjointed from the apparatus of FIG. 1. FIG. 4 is a top view illustrating an apparatus of manufacturing mesoporous silica according to an embodiment of the inventive concepts. FIG. 5 is a side view illustrating an apparatus of manufacturing mesoporous silica according to an embodiment of the inventive concepts.

As shown in FIGS. 1 to 5, an apparatus of manufacturing mesoporous silica according to an embodiment of inventive concepts may include a mount 100, a reactor 200, an impeller 300 and a heating unit 400.

The mount 100 is a part for shaping entire appearance of the apparatus of manufacturing mesoporous silica. The mount 100 has structure of interconnecting metal frames.

A plurality of wheels is mounted on the lower part of the mount 100 such that an operator can move the mount to predetermined position by hands.

The reactor 200 may be installed to the mount 100, and a mixed solution of surfactant for manufacturing mesoporous silica, water and acid may be to be poured in the reactor 200.

The surfactant may be polyalkylene oxide block copolymer, for example polyethylene oxide-block-polypropylene oxide-polyethylene oxide. The surfactant may be available from Pluronic P123 of BASF Corporation. The acid act as a catalyst, for example hydrochloric acid may be available.

Further, a silica precursor and a transition metal salt may be further added to the mixed solution. A variety of silica precursors well known in this field may be available, for example TEOS (TetraEthylOrthoSilicate). At least one of titanium, vanadium, chrome, manganese, iron, cobalt, nickel, copper or zinc may be selected. Then, the transition metal salt may be nitrate, hydrochloride, acetate, sulfate, carbonate, oxide or hydroxide of these transition metals.

As shown in FIG. 3, the reactor 200 may include a cylindrical main body 210, a supporter 220 coupled to the bottom surface of the main body 210 and a reactor cover 230 covering the top surface of the main body 210.

The reactor 200 is not limited to this structure, and can be implemented in various forms. For example, the main body 210 and the supporter may be in one body. The reactor 200 may be rotatably coupled to the mount 100.

Shafts 211 may be respectively coupled to both sides of an upper portion of the main body 210 to extend horizontally, a pair of brackets 120 where the shafts 211 are respectively inserted may installed on the mount 100.

When the reactor 200 is pushed or pulled by external force, the shaft 211 is rotated while being inserted in the bracket 120, thereby the reactor 200 can be rotated on the mount 100.

If the reactor 200 is installed rotatably to the mount 100, it is available that the mesoporous silica formed in the reactor 200 be easily drawn off by rotating the reactor after stirring process by the impeller 200 and ageing process under pressurizing and heating condition. This will now be described more fully hereinafter.

There are accident hazards if the reactor 200 is vibrated or rotated during the stirring and the ageing processes. Thus, the reactor 200 may be fastened on the mount 100 during the stirring and ageing processes.

So, a stopper 221 may be installed to protrude on the bottom surface of the supporter 220, and a coupling plate 130 may be installed on the mount 100. The coupling plate 130 is coupled with the stopper 221 to fasten the reactor 200 on the mount 100.

Therefore, the operator couples the stopper 221 to the coupling plate 130 thereby the reactor 200 is fastened on the mount during the stirring and ageing processes, and release the stopper 221 from the coupling plate 130 thereby the reactor 200 can be rotated on the mount 100 when the mesoporous silica is drawn off from the reactor 200 after the stirring and ageing processes.

Since the reactor 200 is manufactured to have a size capable of containing the mixed solution over 20 liter, the weight is not light. And, it is difficult for the operator to rotate the reactor 200 directly because the reactor 200 is heated by a heating unit 400.

Thus, a lifting apparatus 500 may be installed on the mount 100. The lifting apparatus 500 may apply external force to the reactor 200 thereby the reactor 200 turns on the shaft 211.

The lifting apparatus 500 may include, as shown in FIG. 1, a pulley 520 installed on the mount 100, a wire wound around the pulley 520 and connected to the reactor 200 and a rotation motor 530 rotating the pulley 520 to wind the wire 510.

The stopper 221 is removed from the coupling plate 130 and then the wire 510 is connected to the bottom portion of the reactor 200, for example the supporter 220 or the stopper 221 followed by operating the rotation motor 530 to wind the wire 510 by the pulley 520, thereby the reactor 200 may be tilted by tensile force of the wire 510 to pivot on the shaft 211.

The impeller 300 may be installed at the reactor 200 to play a part of stirring the mixed solution.

The impeller 300 may include a rotation axis 310 installed at the reactor cover, an impeller motor 320 installed on the top end of the rotation axis 310 and a blade 330 installed on the bottom end of the rotation axis 310.

If the impeller 320 starts operation to rotate the rotation axis 310, the blade 330 located in the reactor 200 are rotating with the rotation axis 310 to stir the mixed solution uniformly.

A height adjusting apparatus 600 is installed on the mount 100. The height adjust apparatus 600 is coupled to the impeller thereby moving the impeller 300 vertically.

If solution level in the reactor 200 is low such that the blade 330 is not immersed in the mixed solution 330, the blade 330 runs idle in the reactor 200 to cause abnormal stirring process. Thus, it is necessary that the height adjusting apparatus 500 for vertically moving the impeller 300 is additionally installed on the mount 100 to adjust height of the impeller 300 according to amount of the mixed solution poured in the reactor 200.

The height adjusting apparatus 600 may include a guide bar 610 installed in vertical direction on the mount 100, a slider 620 coupled vertical movably on the guide bar 610 and a connector 630 connecting the slider 620 and the impeller 300.

When the mixed solution is poured in the reactor insufficiently, the slider 620 is vertically descended along the guide bar 610 to have the impeller 300 connected with the connector 630 lowered such that the blade 300 located in the reactor 200 is immersed in the mixed solution. It is a matter of cause that the slider 620 can be ascended to move up the height of the impeller 300 as occasion demands.

The heating unit 400 is installed to cover the outer surface of the reactor 200 to play a role for heating the reactor 200.

The stirring process by the impeller 300 and the ageing process performed after the stirring process may be implemented at different temperatures each other. Specifically, the stirring process by the impeller 300 may be performed at 30° C. to 50° C., and the ageing process may be performed at 110° C. to 130° C.

Thus, the heating unit 400 may heat the reactor 200 until temperature of the mixed solution in the reactor becomes 30° C. to 50° C., and then heat the reactor 200 until 110° C. to 130° C. during the ageing process.

As shown in FIG. 2, the heating unit 400 may include an inner case 410 covering an outer surface of the main body 210, an outer case 420 covering the inner case 410 and a heating line 430 installed on an inner surface of the outer case 420.

Thus, power is supplied to the heating line 430, and then heat generated by the heating line 430 is transferred through the inner case 420 to the reactor 200, that is to say, main body 210 thereby heating the mixed solution at predetermined temperature.

A temperature sensor 700 may be installed at the reactor cover 230. The temperature sensor 700 may extend into the main body 210 to measure temperature of the mixed solution. The temperature of the mixed solution can be confirmed in real time such that the mixed solution can be maintained at even temperature during the stirring and ageing process.

Figure 6:
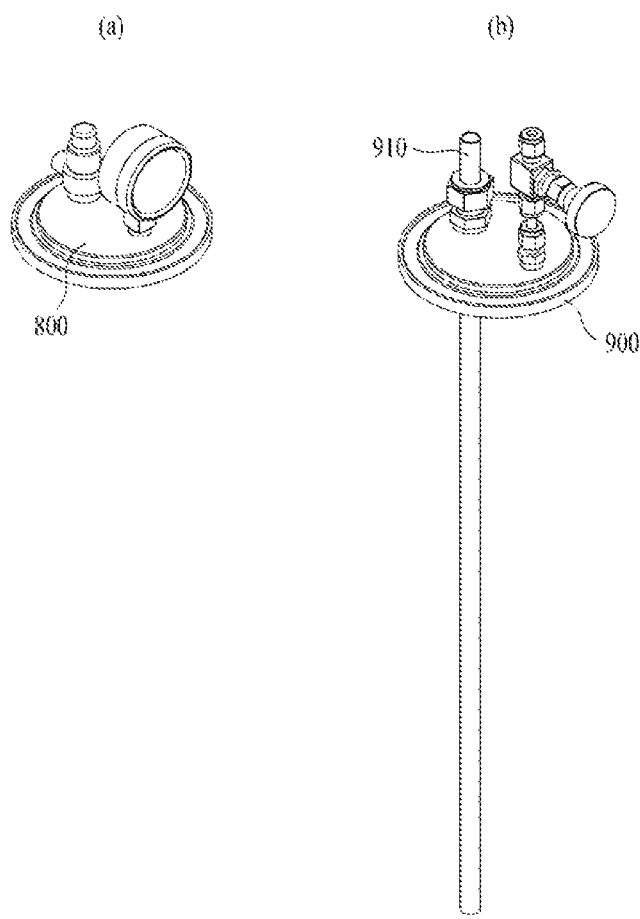
FIG. 6 is a perspective view illustrating structures of an aging cap and a drain cap according to an embodiment of the inventive concepts.

FIG. 6 is a perspective view illustrating structure of an aging cap and a drain cap according to an embodiment of the inventive concepts.

The ageing process may be performed heating and pressurizing condition that the reactor 200 is heated by the heating unit 400 while closing the interior of the reactor 200. Thus, if the stirring process is complete, the impeller 300 is removed from the reactor cover 230 and an ageing cap 800 shown in FIG. 5 is installed on the reactor cover 230 thereby closing the reactor 200.

After completing the ageing process, as described above, the reactor is tilted on the mount 100 to draw off the mesoporous silica from the reactor 200 for the purpose of following process such as cleaning and drying.

In this time, after removing the ageing cap 800 from the reactor cover 230, a drain cap shown in FIG. 6(b) which has a drain 910 extending into the reactor 200 is installed at the reactor cover 230 such that the mesoporous silica may draw off through the drain 910.

The notation C is a controller which drives the impeller motor 320, the heating unit 400 and the rotation motor 530.

The process for manufacturing the mesoporous silica using the apparatus of manufacturing the mesoporous silica according to the embodiments of the inventive concept will be described hereinafter.

First of all, the stopper 221 is coupled at the coupling plate 130 to fasten the reactor 200 on the mount 100 followed by pouring the mixed solution of surfactant, acid and water. Transition metal salt and silica precursor may be added to the mixed solution.

While maintaining the mixed solution at 30° C. to 50° C. by heating the reactor 200 using the heating unit 400, the impeller 300 is driving to stir the mixed solution.

The height of the impeller 300 may be adjusted according to amount of the mixed solution which is poured in the reactor 200 in order that the blade 330 of the impeller stirring the mixed solution is immersed in the mixed solution.

After removing the impeller 300 from the reactor cover 230, the ageing cap 800 is installed at the reactor cover 230 to close completely the interior of the reactor 200.

The reactor 200 is heated by the heating unit 400 to increase inner pressure of the reactor 200 and simultaneously raise temperature of the mixed solution until 110° C. to 130° C. such that the mixed solution is aged in heating and pressurizing condition.

After forming the mesoporous silica in the reactor 200 by the aging process, the ageing cap 800 may be removed from the reaction cover 230 followed by installing the drain cap 900 with drain 910 at the reactor cover 230.

After removing the stopper 221 from the coupling plate 130, the reactor is pivoted on the mount 100 such that the mesoporous silica draws off through the drain 910.

The pivoting of the reactor 200 may be implemented naturally if the wire 510 wound around the pulley 520 is connected to the bottom end of the reactor 200 followed by rotating the pulley 520 to be winding the wire 510.

Finally, the mesoporous silica which was drawn off is filtered and cooled at room temperature followed by cleaning with water, and then cleaned mesoporous silica is dried and calcined to manufacture the mesoporous silica with meso-pores.

According to the embodiments of the inventive concept, the stirring and ageing process is sequentially processed in the reactor, and more specifically the heating unit heats the reactor at the temperatures necessary for the stirring and ageing process sequentially. Thus, time for manufacturing process can be steeply reduced without transferring the mixed solution by processes like conventional arts.

Further, according to the embodiments of the inventive concept, the capacity of the reactor can be increased as occasion demands to manufacture the mesoporous silica in large quantities.

While the inventive concepts have been described with reference to example embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A method of manufacturing mesoporous silica using an apparatus for manufacturing the mesoporous silica, the method comprising:

pouring a mixed solution of surfactant, silica precursor, acid and water into a reactor after fastening the reactor on a mount, the reactor comprising a cylindrical main body, a supporter coupled to a bottom surface of the main body, and a reactor cover covering a top surface of the main body, wherein the reactor is rotatably coupled to the mount by having shafts respectively coupled on both sides of an upper portion of the main body to extend along a horizontal direction, and a pair of brackets installed to the mount, thereby inserting the shafts in the brackets, respectively, wherein a stopper is formed to protrude from a bottom surface of the supporter, wherein a coupling plate is installed to the mount and coupled with the stopper to fasten the reactor to the mount;

heating the reactor using a heating unit and simultaneously operating an impeller to stir the mixed solution, wherein the heating unit is installed to cover an outer surface of the reactor, thereby heating the reactor, wherein the impeller is installed to the reactor and rotates to stir the mixed solution;

installing an ageing cap on a reactor cover to completely close the interior of the reactor after removing the impeller from the reactor cover;

heating the reactor by the heating unit to increase inner pressure of the reactor and to raise temperature of the mixed solution to perform the ageing of the mixed solution; and rotating the reactor on the mount to draw off the mesoporous silica through a drain.

2. The method of claim 1, further comprising:

adjusting a height of the impeller in order to immerse a blade of the impeller in the mixed solution before the mixed solution is stirred by the impeller.

* * * * *